(12) United States Patent
Mennig et al.

(10) Patent No.: US 7,993,799 B2
(45) Date of Patent: Aug. 9, 2011

(54) OPTICAL COMPONENTS MADE FROM PHOTOSENSITIVE INORGANIC/ORGANIC HYBRID MATERIALS

(75) Inventors: Martin Mennig, Quierschied (DE); Peter William Oliveira, Saarbruecken (DE)

(73) Assignee: EPG (Engineered nanoPRODUCTS Germany) AG, Saarbruecken (DE)

( * ) Notice: Subject to any disclaimer, the term of this patent is extended or adjusted under 35 U.S.C. 154(b) by 960 days.

(21) Appl. No.: 11/721,206

(22) PCT Filed: Dec. 19, 2005

(86) PCT No.: PCT/EP2005/013683
§ 371 (c)(1),
(2), (4) Date: Oct. 22, 2007

(87) PCT Pub. No.: WO2006/066856
PCT Pub. Date: Jun. 29, 2006

(65) Prior Publication Data
US 2008/0081264 A1    Apr. 3, 2008

(30) Foreign Application Priority Data
Dec. 20, 2004 (DE) .......................... 10 2004 061 324

(51) Int. Cl.
*G03H 1/02* (2006.01)
*G02B 3/00* (2006.01)
*G02B 6/18* (2006.01)

(52) U.S. Cl. .......... 430/1; 430/2; 430/280.1; 430/281.1; 359/3

(58) Field of Classification Search .................. None
See application file for complete search history.

(56) References Cited

U.S. PATENT DOCUMENTS

| 5,258,024 A | 11/1993 | Chavel et al. |
| 5,529,473 A | 6/1996 | Lawton et al. |
| 5,552,261 A | 9/1996 | Kraska et al. |
| 5,858,526 A | 1/1999 | Floch et al. |
| 6,236,493 B1 | 5/2001 | Schmidt et al. |
| 6,291,070 B1 | 9/2001 | Arpac et al. |
| 6,639,039 B1 | 10/2003 | Fries et al. |
| 7,323,275 B2 * | 1/2008 | Otaki et al. ........................ 430/1 |
| 2004/0071422 A1 | 4/2004 | Aylward et al. |
| 2005/0059760 A1 | 3/2005 | Dellwo et al. |
| 2007/0095736 A1 * | 5/2007 | Malik et al. ................. 210/198.2 |
| 2008/0247009 A1 * | 10/2008 | Mennig et al. ..................... 359/3 |

FOREIGN PATENT DOCUMENTS

| DE | 197 19 948 | 11/1998 |
| DE | 102 00 648 | 7/2003 |
| DE | 102004061324 | * 12/2004 |
| EP | 1 408 352 | 4/2004 |
| WO | 97/38333 | 10/1997 |

OTHER PUBLICATIONS

Holleman, Wiberg, Lehrbuch der Anorganischen Chemie, vol. 91-100, deGruyter, 1985, p. 970.
A. Zimmermann et al., Light Management Films Based on Nanocomposite Coatings, paper at 5th Int. Conf. Coatings on Glass, Saarbruecken, Germany, Jul. 4 to 8, 2004.
C.J. Brinker, G.W. Scherer, Sol-Gel Science: The Physics and Chemistry of Sol-Gel Processing, Academic Press 1990, pp. 108-115.
U.S. Appl. No. 11/721,208 (Mennig et al.), filed Jun. 8, 2007.

* cited by examiner

*Primary Examiner* — Martin J Angebranndt
(74) *Attorney, Agent, or Firm* — Greenblum & Bernstein, P.L.C.

(57) ABSTRACT

An organic-inorganic hybrid material comprising (a) at least one soluble organic polymer, (b) at least one mono- or polynuclear metal complex having at least one ligand which comprises at least one photochemically and/or thermally polymerizable functional group and (c) surface-modified nanoscale particles. Also disclosed is an optical component which is made by using the hybrid material.

35 Claims, No Drawings

OPTICAL COMPONENTS MADE FROM PHOTOSENSITIVE INORGANIC/ORGANIC HYBRID MATERIALS

CROSS-REFERENCE TO RELATED APPLICATIONS

The present application is a U.S. National Stage of International Application No. PCT/EP2005/013683, filed Dec. 19, 2005, which claims priority of German Patent Application No. 10 2004 061 324.9, filed Dec. 20, 2004.

BACKGROUND OF THE INVENTION

1. Field of the Invention

The present invention relates to optical components having refractive index gradients, to their use, to methods of producing them via organic-inorganic hybrid materials, and to said hybrid materials.

2. Discussion of Background Information

It is known that the diffusion of monomers whose refractive index is higher or else lower than that of the surrounding liquid matrix can be utilized for the production of a refractive index gradient, as described for example in U.S. Pat. No. 5,552,261 and U.S. Pat. No. 5,529,473. The Colburn-Haines effect known for photopolymers and relating to directed diffusion with subsequent polymerization in the heated or exposed areas, leads to an increase in density and hence to an increase or reduction in the refractive index (RI). In the case of organic monomers, however, this change is small, since the change in density which comes about makes only a small contribution to the molar refraction. The RI gradient profile is fixed thereafter by aftercrosslinking, by way of photopolymerization for example.

Disadvantages of these materials are relatively small RI increases, long operating times, and high scattering losses. From WO 97/38333 it is known that RI gradients can also be produced by way of the migration of nanoparticles of high or low refractive index in a liquid, photopolymerizable matrix (sol) and fixed by way of subsequent crosslinking (polymerization, condensation). The key drawback of that process is that it is tied to a liquid matrix phase. Consequently, handling problems arise with the application of holographic techniques or mask exposure techniques.

A further factor is that the RI differences in polymers, even via the Colburn-Haines effect, are relatively small, owing to the physical properties of the material. Other studies describe the diffusion of nanoparticles in incompletely compacted polymer matrices under the influence of gradient-forming measures, such as, for example, A. Zimmermann et al., Light-Management Films Based on Nanocomposite Coatings, paper at 5th Int. Conf. Coatings on Glass, Saarbrücken, Germany, 4 to 8 Jul. 2004. The RI difference is achieved by concentrating relatively high-RI inorganic nanoparticles. A drawback of that process is that the diffusion rate of the particles is smaller by one or more orders of magnitude than that of organic monomers, and the operation necessarily entails the presence of hydrolysable or hydrolysed silanes. These silanes give the materials a relatively high moisture sensitivity (e.g. C. J. Brinker, G. W. Scherer, Sol-Gel Science: The Physics and Chemistry of Sol-Gel Processing, Academic Press 1990).

DE-A-10200648 describes a process for producing holographic films and diffuser films, in which nanoparticles in conjunction with hydrolysable or hydrolysed silanes are vital to the production of holographic structures. These compounds and their preparation each exhibit the drawbacks referred to above. Condensation of the silanes may also lead to three-dimensional crosslinking and hence to the embrittlement of the material.

It is an object of the present invention, therefore, to develop a material capable of building up a sufficiently high RI gradient by application of external fields or use of gradient-forming measures, which does not have the aforementioned drawbacks, in particular the drawbacks due to the silanes, such as, for example, the high moisture sensitivity, caused by the high proportion of uncrosslinked residual OH groups, and the inorganic three-dimensional crosslinking caused by condensation of the silanes, and hence embrittlement of the material.

It has now surprisingly been found that this object can be accomplished by means of a polymer which forms a solid or viscous matrix and in which certain metal complex compounds are dispersed or dissolved, without the need for silanes.

SUMMARY OF THE INVENTION

The present invention provides an organic-inorganic hybrid material comprising (a) at least one soluble organic polymer and (b) at least one mono- or polynuclear metal complex having at least one ligand which comprises at least one photochemically and/or thermally polymerizable functional group and (c) a plurality of surface-modified nanoscale particles.

In one aspect, the hybrid material may further comprise at least one component selected from solvents, organic monomers, organic oligomers, and plasticizers.

In another aspect, the material may comprise, based on the total dry weight thereof, (a) from 4.9% to 95.9% by weight, e.g., from 10% to 80% by weight or from 20% to 40% by weight of at least one soluble organic polymer, (b) from 0.5% to 50% by weight of at least one mono- or polynuclear metal complex having at least one ligand which comprises at least one photochemically and/or thermally polymerizable functional group, (c) from 0.1% to 30% by weight of surface-modified nanoscale particles which are selected from one or more of oxides, sulphides, selenides, tellurides, halides, carbides, arsenides, antimonides, nitrides, phosphides, carbonates, carboxylates, phosphates, sulphates, silicates, titanates, zirconates, stannates, plumbates, aluminates and corresponding mixed oxides, and metals, (d) from 0% to 50% by weight, e.g., from 0.1% to 30% by weight or from 1% to 20% by weight of one or more plasticizers, (e) from 0% to 5% by weight, of at least one additive selected from one or more of thermal and/or photochemical polymerization or crosslinking initiators, sensitizers, wetting aids, adhesion promoters, antioxidants, flow control agents, stabilizers, dyes, and photochromic or thermochromic compounds, e.g., up to 5% by weight of at least one substance selected from thermal and/or photochemical polymerization or crosslinking initiators, (f) from 0% to 4.9% by weight of organic monomers (g) from 0% to 50% by weight of organic oligomers. from solvents, organic monomers, organic oligomers, and plasticizers.

In another aspect, the hybrid material may be solid or viscous.

In yet another aspect, the hybrid material may comprise the above component (f) which may comprise an acrylate and/or may comprise the above component (g) which may comprise an oligomer of an acrylate. For example, the acrylate may comprise one or more of methyl methacrylate, a diol diacrylate and a diol dimethacrylate.

In a still further aspect of the hybrid material of the present invention, the at least one soluble polymer may comprise one or more of a polyacrylate, a polymethacrylate, a polyepoxide, polyvinyl alcohol, polyvinyl acetate, polyvinyl butyral and polyacrylamide and/or the at least one mono- or polynuclear metal complex may comprise at least one alkoxide group on a central metal atom thereof.

In another aspect of the hybrid material, the at least one ligand may be selected from carboxylic acids, β-diketones, CH-acidic compounds, chelate ligands, amino acids, peptides and proteins and corresponding bases thereof, each of which contain at least one group which is photochemically and/or thermally polymerizable.

In another aspect, the at least one functional group which is photochemically and/or thermally polymerizable may be selected from C=C double bonds, hydroxyl, epoxy and amino groups.

In another aspect of the hybrid material, the at least one ligand may comprise at least one photochemically polymerizable functional group.

In another aspect of the hybrid material of the present invention, component (c) may comprise one or more of $TiO_2$, $ZrO_2$, $Nb_2O_5$ and $Ta_2O_5$.

In another aspect, the surface-modified nanoscale particles may comprise polymerizable surface groups. For example, the polymerizable surface groups may comprise one or more of (meth)acryloyl, allyl, vinyl, epoxy, hydroxyl, carboxyl and amino groups.

The present invention also provides an organic-inorganic hybrid material which comprises, based on the total dry weight thereof,
(a) from 20% to 40% by weight of at least one soluble organic polymer which comprises one or more of a polyacrylate, a polymethacrylate, a polyepoxide, polyvinyl alcohol, polyvinyl acetate, polyvinyl butyral and polyacrylamide,
(b) from 0.5% to 50% by weight of at least one mono- or polynuclear metal complex having at least one ligand which comprises at least one functional group which is at least photochemically polymerizable,
(c) from 0.1% to 30% by weight of surface-modified nanoscale particles which comprise polymerizable surface groups and one or more of $TiO_2$, $ZrO_2$, $Nb_2O_5$ and $Ta_2O_5$,
(d) from 1% to 20% by weight of one or more plasticizers,
(e) up to 5% by weight of at least one additive selected from one or more of thermal or photochemical polymerization or crosslinking initiators, sensitizers, wetting aids, adhesion promoters, antioxidants, flow control agents, stabilizers, dyes, and photochromic or thermochromic compounds,
(f) from 0% to 4.9% by weight of organic monomers which comprise one or more of methyl methacrylate, a diol diacrylate and a diol dimethacrylate
(g) from 0% to 50% by weight of organic oligomers derived from one or more of methyl methacrylate, a diol diacrylate and a diol dimethacrylate.

In one aspect of this hybrid material, the at least one mono- or polynuclear metal complex may comprise at least one alkoxide group on a central metal atom thereof.

In another aspect, the at least one ligand may be selected from carboxylic acids, βdiketones, CH-acidic compounds, chelate ligands, amino acids, peptides and proteins and corresponding bases thereof, each of which contain at least one group which is at least photochemically polymerizable.

The present invention also provides a method of producing an optical component. The method comprises
(a) applying a hybrid material of the present invention as set forth above, including the various aspects thereof, to a substrate or placing the hybrid material into or onto a mould,
(b) optionally, drying the hybrid material to render it solid or viscous,
(c) patternwise heating or irradiating the solid or viscous hybrid material to produce a refractive index gradient in the hybrid material, and
(d) thermally and/or photochemically curing the heated or irradiated hybrid material substantially completely to fix the refractive index gradient.

In one aspect of the method, step (c) may be carried out at a temperature of from 30 to 90° C., e.g., at a temperature of from 50 to 70° C.

In another aspect, the hybrid material may be applied to a transparent polymeric film and, if desired, a transparent liner film may be laminated onto the undried or dried hybrid layer.

In yet another aspect, step (c) may comprise a patternwise irradiation by means of at least one of holography, lithography and local irradiation.

In a still further aspect, a refractive index gradient may be produced in the hybrid material perpendicularly to the direction of irradiation.

In another aspect of the method, a local irradiation of the hybrid material may produce a refractive index gradient perpendicularly to the direction of irradiation.

In another aspect, the method may further comprise a delamination of the substantially completely cured hybrid layer from the substrate to afford the hybrid layer in the form of a film or sheet.

The present invention also provides an optical component which is obtainable by a method which comprises
(a) applying a hybrid material according to the present invention as set forth above, including the various aspects thereof, to a substrate or placing a hybrid material into or onto a mould,
(b) optionally, drying the hybrid material to render it solid or viscous,
(c) patternwise heating or irradiating the solid or viscous hybrid material to produce a refractive index gradient in the hybrid material, and
(d) thermally and/or photochemically curing the heated or irradiated hybrid material substantially completely to fix the refractive index gradient.

In one aspect, the optical component may be present as a coated substrate or a moulding.

For example, it may be present as a film.

In another aspect, the optical component may comprise a transparent or translucent hybrid layer with refractive index gradients. For example, the optical component may be present as a refractive index gradient film. The refractive index gradient film may, for example, comprise or substantially consist of one or more transparent polymeric films coated with a hybrid material which comprises a refractive index gradient.

The present invention also provides an imaging optical element, a light-guiding optical component and a holographic data storage, all of which comprise the optical component of the present invention as set forth above, including the various aspects thereof.

DETAILED DESCRIPTION OF THE INVENTION

The invention accordingly provides an organic-inorganic hybrid material comprising a) a soluble organic polymer, b) a mono- or polynuclear metal complex having at least one ligand containing at least one photochemically or thermally polymerizable functional group, and c) surface-modified nanoparticles.

The invention further provides a method of producing an optical component, characterized in that a) an organic-inorganic hybrid material of the invention is applied to a substrate or placed into or onto a mould, b) the hybrid material is dried if desired so that it becomes solid or viscous, c) the solid or viscous hybrid material is heated patternwise or preferably irradiated patternwise in order to produce a refractive index gradient in the hybrid material, and d) the hybrid material is subsequently fully cured thermally and/or photochemically, thereby fixing the refractive index gradient.

Besides the soluble organic polymer, the nanoparticles and the metal complex the hybrid material of the invention may further comprise solvents, organic monomers or oligomers, plasticizers and/or other additives.

The organic-inorganic hybrid material preferably comprises, accordingly, based on the total dry weight:

a) 4.9% to 95.9%, preferably 10% to 80%, in particular 20% to 40% by weight of a soluble polymer,
b) 0.5% to 50% by weight of a mono- or polynuclear metal complex having at least one ligand containing at least one photochemically or thermally polymerizable functional group,
c) 0.1% to 30%, preferably 1% to 40%, in particular 5% to 30% by weight of surface-modified nanoscale particles from the group of oxides, sulphides, selenides, tellurides, halides, carbides, arsenides, antimonides, nitrides, phosphides, carbonates, carboxylates, phosphates, sulphates, silicates, titanates, zirconates, stannates, plumbates, aluminates and corresponding mixed oxides, and of metals,
d) 0 to 50%, preferably 0.1% to 30%, more preferably 1% to 20% by weight of a commercially customary plasticizer,
e) 0 to 5% by weight, preferably 0.01% to 1% by weight, of one or more additives, preferably selected from thermal or photochemical polymerization or crosslinking initiators, sensitizers, wetting aids, adhesion promoters, antioxidants, flow control agents, stabilizers, dyes, photochromic or thermochromic compounds, and
f) 0 to 4.9% by weight of organic monomers and/or 0 to 50% by weight of organic oligomers.

The total dry weight refers to the total weight of the hybrid material without solvents. Components a) to f) preferably account for 100% by weight of the total dry weight; in other words, apart from these components and the optional solvent, the hybrid material preferably contains no further components. It is particularly preferred for the hybrid material not to contain any hydrolysable or hydrolysed silanes and also not to contain any condensation products thereof (both partly and fully condensed silanes). These condensates also comprise $SiO_2$.

Suitable soluble polymers include all of the conventional soluble organic polymers, and mixtures of soluble polymers can be used as well. Particularly preferred are polymers which are soluble in organic solvents, for instance, in alcohols, such as ethanol, isopropanol or butanol, ketones, such as acetone, esters such as ethyl acetate, ethers such as tetrahydrofuran and glycols, such as ethylene glycol, and aliphatic, aromatic and halogenated hydrocarbons, such as hexane, benzene, toluene and chloroform. Examples of such soluble polymers are acrylates, such as polyacrylate, polymethacrylate, polyepoxide, polyvinyl alcohol, polyvinyl acetate, polyvinyl butyral and polyacrylamide. As soluble polymer, such polymers may, for example, be used which have a solubility of at least 20 g/l at 20° C. in the solvent employed.

The mono- or polynuclear metal complexes used in accordance with the invention are complexes of metals, with one or more central metal atoms. For the complex it is possible to use any metals, examples being metals from main groups two to six, preferably two to five, of the Periodic Table of the Elements or from transition groups one to eight of the Periodic Table of the Elements, or the transition metals, including the lanthanoids and actinoids. Preference is given to Zn, Ti, Zr, Ce, Sn, La, Fe, Ta, Hf, Nb, Al, Cu, V, M, W, Ag and Cu, particular preference to Ti, Zr, Ta and Nb. Semimetals such as Si, B or As are not metals.

Besides the ligand or ligands which contain the photochemically or thermally polymerizable group the complexes may preferably comprise further typical groups as complex ligands. These complex ligands are known to the skilled person. Examples of such further ligands are alkoxides, preferably $C_{1-6}$ alkoxides, phenoxy, halides (F, Cl, Br, I), oxo and amine. Examples of organic ligands are carboxylic acids, β-diketones, such as acetoacetates or acetylacetonates, CH-acidic compounds, chelate ligands, having for example one or more amino, oxo and/or hydroxyl groups, such as EDTA or en (ethylenediamine), amino acids, peptides and proteins or corresponding bases of these compounds. The corresponding base of carboxylic acid, for example, is a carboxylate compound, such as the acetate anion. Further examples of ligands are given for example in Holleman, Wiberg, Lehrbuch der Anorganischen Chemie, vol. 91-100, deGruyter, 1985, p. 970.

The ligands containing the thermally or photochemically polymerizable functional group may be an organic ligand, particularly one of the examples given above of organic ligands, which additionally contains at least one photochemically or thermally polymerizable functional group. These ligands are commonly difunctional compounds, having a functional group for attachment to the metal, and the polymerizable group. The polymerizable groups are reactive groups which are able, with themselves or with other groups, to enter into linking reactions which may be initiated photochemically or thermally. Polymerization and polymerizable here and in the following also include polycondensation and polycondensable, and polyaddition and polyadditionable, and encompass crosslinking reactions and curing reactions as well. The polymerizable groups are known to the skilled worker.

Examples of polymerizable groups are C=C double bonds, OH groups, epoxy groups, amino groups or other groups which can be linked to one another chemically, it being possible for the formation of this link to be initiated photochemically or thermally. The linking involved may be that of different groups with one another. In that case use is made in each case, as the metal complex, of complexes containing the different groups, in order to ensure linking. Preference is given to thermally or photochemically polymerizable groups which possess a (meth)acryloyl, allyl, vinyl or epoxy group, particular preference being given to (meth)acryloyl groups and epoxy groups. Amino groups are also suitable and are able to enter into condensations with, for example, epoxide groups, OH groups or acid chlorides. Particular preference is given in this context to primary monoamino groups. Photochemically polymerizable groups are preferred.

A preferred ligand containing no polymerizable group is alkoxide. The metal complexes are therefore obtained preferably from the reaction of typical metal alkoxides with the ligand containing the photochemically or thermally polymerizable functional group and, if desired, further ligands. The metal complexes are preferably able to form, by further reaction, chalcogenides, sulphides, halides or metals. For example, the metal complexes may be converted by hydrolysis or acidolysis to chalcogenides or halides. The metal complexes are preferably complexes with ligands having double bonds or other photochemically or thermally crosslinkable organic groups which are coupled via known coupling groups (e.g. groups forming complex bonds) to the central atoms of the complex-forming metal. The metal complexes preferably do not contain silanes as ligands.

The nanoparticles are added at concentrations of up to 30% by weight, based on the total dry weight. They may also produce transparent colour effects. Preference is given to inorganic nanoparticles, and particularly those from the group of oxides, sulphides, selenides, tellurides, halides, carbides, arsenides, antimonides, nitrides, phosphides, carbonates, carboxylates, phosphates, sulphates, silicates, titanates, zirconates, stannates, plumbates, aluminates and corresponding mixed oxides, and of metals.

The surface-modified nanoparticles comprise preferably the oxides $ZnO$, $TiO_2$, $ZrO_2$, $CeO_2$, $SnO_2$, $La_2O_3$, $Fe_2O_3$, $Ta_2O_5$, $Hf_2O_5$, $Nb_2O_5$, $Cu_2O$, $V_2O_5$, $MO_3$ and $WO_3$, and also the halides AgCl, AgBr, AgI, CuI and CuBr. It is, however, possible to use sulphides, insoluble sulphates or other salts of sparing solubility, and also metal colloids, from the group for example of the noble metals and Cu. Mixed oxides or complex oxides may similarly be used. Examples thereof are PZT, barium titanate and similar compounds.

The nanoparticles are surface-modified, i.e. there are radicals, preferably organic groups or molecules attached to the surface of the particles. These groups may either be immobilized on the surface of the nanoparticle or may form part of a complex ligand; in that case the group to be employed for crosslinking is used in the form of a monomer, and vice versa. The organic groups present on the surfaces of the nanoscale particles preferably have addition-polymerizable and/or polycondensable groups and they have preferably a molecular weight of below 300, in particular below 200.

Processes suitable for producing the surface-modified nanoparticles include all customary processes, such as described for example in DE-A-19719948. The nanoparticles can be introduced into the system in a variety of ways: on the one hand, commercially available nanoparticles, following appropriate compatibilization or surface modification, can be used as colloidal suspensions in solvents (miscible with the solvent of the hybrid material).

The surface modification can be obtained by reaction of nanoparticles with surface modifiers. Surface modifiers which can be used are organic compounds having a reactive group which is able to interact with the surface groups on the nanoparticles and which preferably forms a covalent bond. Examples of these organic compounds are amines or alcohols and, in particular, the organic ligands set out in connection with component b). The surface modifier possesses, if desired, a functional group, and preferably the addition-polymerizable and/or polycondensable groups discussed below. Examples of surface modifiers comprising addition-polymerizable groups of this kind are unsaturated carboxylic acids, especially methacrylic acid and acrylic acid, and/or unsaturated β-diketones. On the other hand, the nanoparticles may also be prepared in situ from known precursors in the presence of the surface modifiers.

The stated surface groups preferably have organic addition-polymerizable and/or polycondensable groups which are amenable to a free-radical, cationic or anionic, thermal or photochemical addition polymerization or to a thermal or photochemical polycondensation. Addition reactions as well, in accordance with the principle of Michael addition, for example, are also suitable. Preferred surface groups are those possessing a (meth)acryloyl, allyl, vinyl or epoxy group, with (meth)acryloyl and epoxy groups being particularly preferred. Amino groups are also suitable and are able to enter into condensations with, for example, epoxide groups, OH groups or acid chlorides. Particular preference is given in this context to primary monoamino groups. Similarly, groups can be used which can be converted to polyurethanes, examples being isocyanate radicals in conjunction with OH groups; particular preference is given in this case to diols.

The nanoparticles preferably have a diameter of not more than 100 nm, in particular not more than 50 nm. With regard to the lower limit there is no particular restriction, although on theoretical grounds this lower limit is generally 0.5 nm, on practical grounds it is in particular at 2 to 3 nm and frequently at 4 to 10 nm.

By diameter here is meant the average particle diameter, relative to the volume average, for which a UPA (ultrafine particle analyser, Leeds Northrup (laser-optical; dynamic laser light scattering)) can be used for measurement. To measure very small particles it is also possible to use electronmicroscopy methods (e.g. via HR-TEM).

Suitable plasticizers include in principle all commercially customary compounds, in accordance for example with DIN 55945 (December 1988). Preference is given to plasticizers selected from the group of acyclic aliphatic dicarboxylic esters, examples being esters of adipic acid, such as di-n-octyl adipate, bis(2-ethylhexyl) adipate, diisodecyl adipate, dibutyl sebacate, dioctyl sebacate and bis(2-ethylhexyl) sebacate; esters of $C_6$-$C_{12}$ dicarboxylic acids with polyalkylene glycols, examples being triethylene glycol bis(n-heptanoate), triethylene glycol bis(2-ethylhexanoate) and triethylene glycol bis(isononanoate); esters of $C_6$-$C_{12}$ carboxylic acids with polyalkylene glycols, an example being triethylene glycol bis(2-ethylbutyrate); diesters of (meth)acrylic acid and polyalkylene glycols, such as polypropylene glycol diacrylate or dimethacrylate, polyethylene glycol diacrylate or dimethacrylate, an example being tetraethylene glycol di(meth)acrylate.

The hybrid material may further comprise other additives (component e)), preferably selected from thermal or photochemical crosslinking initiators, sensitizers, wetting aids, adhesion promoters, antioxidants, flow control agents, stabilizers, dyes, photochromic and thermochromic compounds or a combination thereof.

The hybrid material advantageously includes a polymerization catalyst (including polyaddition catalysts and/or polycondensation catalysts) which is able to induce crosslinking and curing thermally and/or photochemically ("polymerization or crosslinking initiator"). Examples of photoinitiators which can be used are the initiators available commercially. Examples of these are Irgacure® 184 (1-hydroxycyclohexyl phenyl ketone), Irgacure® 500 (1-hydroxycyclohexyl phenyl ketone, benzophenone) and other photoinitiators of the Irgacure® type; Darocur® 1173, 1116, 1398, 1174 and 1020, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone. It is also possible to use photoinitiators and complementary sensitizers which are excited, for example, by visible light.

Suitable thermal initiators preferably include organic peroxides in the form of diacylperoxides, peroxydicarbonates, alkyl peresters, dialkyl peroxides, perketals, ketone peroxides and alkyl hydroperoxides. Examples of thermal initiators of this kind are dibenzoyl peroxide, tert-butyl perbenzoate and azobisisobutyronitrile. One example of a cationic thermoinitiator is 1-methylimidazole. Examples of flow control agents are polyether-modified dimethylpolysiloxanes, such as Byk 306®. Examples of sensitizers are amine-modified oligoether acrylates, such as Crodamers®.

Organic monomers and/or oligomers used are, in particular, those which are soluble in the solvent used. Suitable monomers or oligomers include in particular all organic compounds which carry the polymerizable or crosslinkable functional groups specified under b). Preference is given to using monomers and/or oligomers having photochemically polymerizable or crosslinkable groups. These can be polymerized or crosslinked with the aid of the photochemical or thermal initiators specified in connection with component e). The amount, based on the total dry-weight, is for example 0 to 54.9% by weight of organic monomers and/or oligomers, preference being given to 0 to 4.9% by weight of monomers and/or 0 to 50% by weight of oligomers.

Preferred examples of these monomers and/or oligomers are acrylates, preferably methyl methacrylates. It is, however, also possible to use diacrylates, for example, such as diol diacrylates or diol dimethacrylates, hexanediol dimethacrylate, hexanediol diacrylate, dodecanediol diacrylate or dodecanediol dimethacrylate, for example.

The hybrid material is generally produced using a solvent. The amount of solvent used in the hybrid material depends on the intended application. In this way the hybrid material serves as a coating composition or moulding compound. Suitable solvents include all typical solvents with which the soluble polymers can be dissolved. Preference is given to organic solvents and water. Mixtures of solvents can be used as well. Examples of organic solvents are alcohols, such as ethanol, isopropanol or butanol, ketones, such as acetone, esters such as ethyl acetate, ethers such as tetrahydrofuran and glycols, such as ethylene glycol, and aliphatic, aromatic and halogenated hydrocarbons, such as hexane, benzene, toluene and chloroform.

The hybrid material is a matrix-forming material and is outstandingly suitable for producing mouldings or coatings having an RI gradient. Accordingly the invention also provides methods of producing such layers and mouldings having RI gradients, and the articles obtained as a result. In the text below, the method is described with reference to coatings. For the production of mouldings, the same comments apply, mutates mutandes, with mouldings being otherwise formable by the typical moulding processes: for example, by introduction into a mould or application to a mould, and removal from the mould after curing. The appropriate processes also include film casting.

In one particularly preferred embodiment a substrate, preferably a backing film, made of polymeric material for example, is coated with the hybrid material as elucidated below, and, after curing, the coating formed is detached (delaminated) from the substrate, giving a self-supporting film or sheet as an optical component having an RI gradient.

The method of producing layers having RI gradients includes the application of the hybrid material to a substrate. Any suitable substrate can be used, preferably glass or polymeric substrates, such as polymeric sheets or polymer films. The substrate is preferably transparent. To produce an RI gradient material the polymerizable hybrid material is applied preferably to a transparent substrate, more preferably to transparent polymeric films, especially PET, PE, PP, TAC or PC.

Coating with the hybrid material may take place in accordance with typical methods, such as by dipping, flooding, knifecoating, pouring, spincoating, injecting, brushing, slot coating, meniscus coating, film casting, roller application, printing, flexographic printing for example, or spraying. The particular viscosity required can be set via the amount of solvent used, via the identity of the polymer or, if desired, via the identity and amount of the monomer and/or oligomer. Preferred layer thicknesses (in the dried or cured state) are between 1 to 100 µm.

The RI (refractive index) gradients are produced by a concentration gradient of the inorganic material in the hybrid material, brought about by zones of inorganically enriched materials of high refractive index. The concentration gradient and hence the RI gradient can be produced by means of any desired gradient-forming measure. The gradient-forming measure is preferably performed on a hybrid material which is solid or viscous. For the gradient-forming measure the hybrid material may have, for example, a viscosity at 25° C. of 2 to 3500 Pas, preferably 500 to 2000 Pas. This can be set, for example, by means of complete or partial removal of the solvent.

Through the gradient-forming measure a potential difference is generated as a driving force for the directed diffusion of the polymerizable metal complexes via differences in chemical potential (in the concentration of chemical compounds or chemical groups), in the same way, for example, as with the above-described Colburn-Haines effect.

The gradient-forming measure is in particular a local or patternwise irradiation or heating of the hybrid layer for the purpose of producing targeted local photochemical or thermal initiation of polymerization which leads to the formation of the concentration gradient. Preference is given to holography, for example two-wave mixing, lithography or local irradiation or exposure as the gradient-forming measure. It is preferred to use laser light, UV light or visible light. The patternwise irradiation may if desired be performed at an elevated temperature of 30 to 90° C. and preferably 50 to 70° C.

Under the influence of the gradient-forming measures, for example a local exposure, and in the presence of a crosslinking initiator, the freely diffusing metal complexes undergo crosslinking or polymerization via the linking of the polymerizable or crosslinkable ligands and hence form local zones having increased refractive indices. It is also possible here for new inorganic bonds to be formed, such as oxidic, sulphidic or metallic bonds, for example, which may likewise contribute to increasing the RI. In this way the concentration gradient is produced.

Preference is given to a coating material comprising the hybrid material which is applied to transparent polymeric films and in which it is possible to produce optical structures having RI gradients, via holography, lithography or local exposure, for example, and to a method of producing a film, in which the hybrid material of the invention is applied by wet-chemical methods to a transparent polymeric film and the solvent is substantially removed by drying, for example to a residual content of 0 to 20% by weight, in particular 0 to 10% by weight, based on the total weight of the hybrid material. In this form, or delaminated from the substrate, the film can be stored as a wound article. In order to prevent unwanted subsequent reactions the film, as is usual in the case of materials sensitive to light, is packaged in a light-protected manner and kept under controlled conditions (15 to 30° C.).

By means of patternwise irradiation, such as by holography, lithography or local exposure, a refractive index gradient is produced, as described, in the hybrid layer.

By means of the transport operation, induced by the thermal diffusion, of the complex molecules which carry crosslinkable bonds, these molecules pass into the area of local exposure, and crosslink at that point with one another or with crosslinkable matrix components. It is also possible here for high-RI nanoclusters or nanoparticles to form owing to the local accumulation of complex molecules. As a result of the relatively high-RI inorganic fractions provided by the composition, the components form relatively high RI regions at the exposed point. In the same way, nanoparticles carrying polymerizable or crosslinkable groups are linked with one another or with crosslinkable matrix components and likewise form relatively high-RI regions. In contrast to this, regions with a lower RI remain in the unexposed adjacent zones. Further complex molecules diffuse from this adjacent zone into the exposed zone. This operation, with the directed diffusion, takes place in the course of exposure and lasts in general for between about one to a few seconds and a few minutes, depending on exposure conditions and temperature. The difference in RI between the relatively high-RI and low-RI regions produces a local RI gradient.

Surprisingly the migration of the linkable or polymerizable/crosslinkable complexes in the hybrid material takes place even when the hybrid material or the matrix is solid or viscous.

This operation is followed by the complete crosslinking of the hybrid material (the matrix) which still contains components having as yet uncrosslinked groups, crosslinking taking place preferably by areal photopolymerization and/or by thermally initiated polymerization, accompanied by fixation of the gradient formed. Any residual solvent still present is removed during this operation (stabilization of the layer). Irradiation with UV light or visible light is preferred for complete curing of the hybrid material and accompanying fixation of the gradient.

The described stabilization of the layer containing the RI gradient is accomplished preferably via areal exposure, those polymerizable groups which have not diffused into the regions of relatively high RI crosslinking with one another and thereby stabilizing the total layer area. In the course of this process the double bonds or other polymerizable groups undergo conversion to the corresponding single bonds.

The degree of conversion expresses the extent of the polymerization reaction of the reactive groups—C=C double bonds or epoxy groups, for example—present in the complex ligands or in the matrix (organic components). An organic degree of conversion of 95%, for example, means that 95% of all the C=C double bonds or epoxy groups have undergone reaction. For determining the degree of conversion there are a variety of measurement methods in the technical literature, examples being infrared measurement methods. The polymerization can be initiated by means of customary initiators, thermally or by means of UV light. Initiators of this kind have been specified above.

The coated substrates and mouldings with RI gradients that are produced by the method of the invention can be used for transparent or translucent layers with refractive index gradients, especially for holographically and photolithographically produced gradient index lenses, holographic images, light-guide components and components in imaging optics.

The RI gradient material of the invention can be used, for example, for producing passive waveguide elements for displays and lighting elements, optical data storage media, for security holograms, picture holograms, digital holograms for information storage, for systems with components which process light wavefronts, for applications as planar waveguides (optical waveguides), for applications for polarizational influencing of light, for applications as beam splitters and as lenses.

What is claimed is:
1. An organic-inorganic hybrid material comprising (a) at least one organic polymer having a solubility in an organic solvent of at least 20 g/L at 20° C. and (b) at least one mono- or polynuclear metal complex having at least one ligand which comprises at least one functional group which is at least one of photochemically and thermally polymerizable, and (c) a plurality of surface-modified nanoscale particles, provided that the hybrid material does not comprise any hydrolyzable or hydrolyzed silanes or any condensation products thereof.

2. The hybrid material of claim 1, wherein the material further comprises at least one component selected from solvents, organic monomers, organic oligomers, and plasticizers.

3. The hybrid material of claim 1, wherein the material comprises, based on a total dry weight thereof,
(a) from 4.9% to 95.9% by weight of at least one organic polymer having a solubility in an organic solvent of at least 20 g/L at 20° C.,
(b) from 0.5% to 50% by weight of at least one mono- or polynuclear metal complex having at least one ligand which comprises at least one functional group which is at least one of photochemically and thermally polymerizable,
(c) from 0.1% to 30% by weight of surface-modified nanoscale particles selected from one or more of oxides, sulphides, selenides, tellurides, halides, carbides, arsenides, antimonides, nitrides, phosphides, carbonates, carboxylates, phosphates, sulphates, silicates, titanates, zirconates, stannates, plumbates, aluminates and corresponding mixed oxides, and metals,
(d) from 0% to 50% by weight of one or more plasticizers,
(e) from 0% to 5% by weight of at least one additive selected from one or more of thermal or photochemical polymerization or crosslinking initiators, sensitizers, wetting aids, adhesion promoters, antioxidants, flow control agents, stabilizers, dyes, and photochromic or thermochromic compounds,
(f) from 0% to 4.9% by weight of organic monomers
(g) from 0% to 50% by weight of organic oligomers.

4. The hybrid material of claim 3, wherein the material comprises component (f) which comprises an acrylate or comprises component (g) which comprises an oligomer of an acrylate, or comprises both component (f) and component (g).

5. The hybrid material of claim 4, wherein the acrylate comprises one or more of methyl methacrylate, a diol diacrylate and a diol dimethacrylate.

6. The hybrid material of claim 3, wherein the material comprises from 10% to 80% by weight of component (a).

7. The hybrid material of claim 6, wherein the material comprises from 20% to 40% by weight of component (a).

8. The hybrid material of claim 3, wherein the material comprises from 0.1% to 30% by weight of component (d).

9. The hybrid material of claim 8, wherein the material comprises from 1% to 20% by weight of component (d).

10. The hybrid material of claim 3, wherein the material comprises up to 5% by weight of at least one substance selected from thermal and/or photochemical polymerization or crosslinking initiators.

11. The hybrid material of claim 1, wherein the material is solid or viscous.

12. The hybrid material of claim 1, wherein the at least one organic polymer (a) comprises one or more of a polyacrylate, a polymethacrylate, a polyepoxide, polyvinyl alcohol, polyvinyl acetate, polyvinyl butyral and polyacrylamide.

13. The hybrid material of claim 1, wherein the at least one mono- or polynuclear metal complex comprises at least one alkoxide group on a central metal atom thereof.

14. The hybrid material of claim 1, wherein the at least one ligand is selected from carboxylic acids, β-diketones, CH-acidic compounds, chelate ligands, amino acids, peptides and proteins and corresponding bases thereof, each of which contain at least one group which is at least one of photochemically and thermally polymerizable.

15. The hybrid material of claim 1, wherein the at least one functional group which is at least one of photochemically and thermally polymerizable is selected from C=C double bonds, hydroxyl, epoxy and amino groups.

16. The hybrid material of claim 1, wherein the at least one ligand comprises at least one photochemically polymerizable functional group.

17. The hybrid material of claim 1, wherein component (c) comprises one or more of $TiO_2$, $ZrO_2$, $Nb_2O_5$ and $Ta_2O_5$.

18. The hybrid material of claim 1, wherein the surface-modified nanoscale particles comprise polymerizable surface groups.

19. The hybrid material of claim 18, wherein the polymerizable surface groups comprise one or more of (meth)acryloyl, allyl, vinyl, epoxy, hydroxyl, carboxyl and amino groups.

20. A method of producing an optical component, wherein the method comprises
    (a) applying a hybrid material of claim 1 to a substrate or placing the hybrid material into or onto a mould,
    (b) optionally, drying the hybrid material to render it solid or viscous,
    (c) patternwise heating or irradiating the solid or viscous hybrid material to produce a refractive index gradient in the hybrid material, and
    (d) thermally and/or photochemically curing the heated or irradiated hybrid material substantially completely to fix the refractive index gradient.

21. The method of claim 20, wherein (c) is carried out at a temperature of from 30 to 90° C.

22. The method of clam 21, wherein (c) is carried out at a temperature of from 50 to 70° C.

23. The method of claim 20, wherein the hybrid material is applied to a transparent polymeric film and, if desired, a transparent liner film is laminated onto the undried or dried hybrid layer.

24. The method of claim 20, wherein (c) comprises patternwise irradiation by at least one of holography, lithography and local irradiation.

25. The method of claim 20, wherein a refractive index gradient is produced in the hybrid material perpendicularly to the direction of irradiation.

26. The method of claim 20, wherein local irradiation of the hybrid material produces a refractive index gradient perpendicularly to the direction of irradiation.

27. The method of claim 20, further comprising delaminating the substantially completely cured hybrid layer from the substrate to afford the hybrid layer in the form of a film or sheet.

28. An organic-inorganic hybrid material comprising, based on a total dry weight thereof,
    (a) from 20% to 40% by weight of at least one organic polymer having a solubility in an organic solvent of at least 20 g/L at 20° C. which comprises one or more of a polyacrylate, a polymethacrylate, a polyepoxide, polyvinyl alcohol, polyvinyl acetate, polyvinyl butyral and polyacrylamide,
    (b) from 0.5% to 50% by weight of at least one mono- or polynuclear metal complex having at least one ligand which comprises at least one functional group which is at least photochemically polymerizable,
    (c) from 0.1% to 30% by weight of surface-modified nanoscale particles which comprise polymerizable surface groups and one or more of $TiO_2$, $ZrO_2$, $Nb_2O_5$ and $Ta_2O_5$,
    (d) from 1% to 20% by weight of one or more plasticizers,
    (e) up to 5% by weight of at least one additive selected from one or more of thermal or photochemical polymerization or crosslinking initiators, sensitizers, wetting aids, adhesion promoters, antioxidants, flow control agents, stabilizers, dyes, and photochromic or thermochromic compounds,
    (f) from 0% to 4.9% by weight of organic monomers which comprise one or more of methyl methacrylate, a diol diacrylate and a diol dimethacrylate
    (g) from 0% to 50% by weight of organic oligomers derived from one or more of methyl methacrylate, a diol diacrylate and a diol dimethacrylate, provided that the hybrid material does not comprise any hydrolyzable or hydrolyzed silanes or any condensation products thereof.

29. An optical component obtainable by a method comprising
    (a) applying a hybrid material to a substrate or placing a hybrid material into or onto a mould, the hybrid material comprising at least one organic polymer having a solubility in an organic solvent of at least 20 g/L at 20° C., at least one mono- or polynuclear metal complex having at least one ligand which comprises at least one functional group which is at leastone of photochemically and thermally polymerizable, and a plurality of surface-modified nanoscale particles, provided that the hybrid material does not comprise any hydrolyzable or hydrolyzed silanes or any condensation products thereof,
    (b) optionally, drying the hybrid material to render it solid or viscous,
    (c) patternwise heating or irradiating the solid or viscous hybrid material to produce a refractive index gradient in the hybrid material, and
    (d) thermally and/or photochemically curing the heated or irradiated hybrid material substantially completely to fix the refractive index gradient.

30. The optical component of claim 29, which is present as a coated substrate or a moulding.

31. The optical component of claim 29, which is present as a film.

32. The optical component of claim 29, which comprises a transparent or translucent hybrid layer with refractive index gradients.

33. The optical component of claim 32, which is present as a refractive index gradient film.

34. The optical component of claim 33, wherein the refractive index gradient film comprises or substantially consists of one or more transparent polymeric films coated with a hybrid material which comprises a refractive index gradient.

35. An imaging optical element, a light-guiding optical component or a holographic data storage which comprises the optical component of claim 29.

* * * * *